US012123423B2

(12) United States Patent
Cartwright

(10) Patent No.: US 12,123,423 B2
(45) Date of Patent: Oct. 22, 2024

(54) ONE-STEP MECHANICAL AND ELECTRICAL MOUNTING BRACKET FOR CEILING FANS AND LIGHTS

(71) Applicant: Thomas Cartwright, Stuart, FL (US)

(72) Inventor: Thomas Cartwright, Stuart, FL (US)

( * ) Notice: Subject to any disclaimer, the term of this patent is extended or adjusted under 35 U.S.C. 154(b) by 0 days.

(21) Appl. No.: 18/513,389

(22) Filed: Nov. 17, 2023

(65) Prior Publication Data

US 2024/0175442 A1 May 30, 2024

Related U.S. Application Data

(60) Provisional application No. 63/577,396, filed on Apr. 24, 2023, provisional application No. 63/577,286, filed on Apr. 14, 2023, provisional application No. 63/475,612, filed on Nov. 25, 2022.

(51) Int. Cl.

| | |
|---|---|
| ***F04D 25/08*** | (2006.01) |
| ***F04D 27/00*** | (2006.01) |
| ***F04D 29/42*** | (2006.01) |
| ***F21V 23/00*** | (2015.01) |
| ***F21V 23/06*** | (2006.01) |
| ***F21V 33/00*** | (2006.01) |
| *F21W 131/30* | (2006.01) |

(52) U.S. Cl.

CPC ......... *F04D 25/088* (2013.01); *F04D 27/007* (2013.01); *F04D 29/4226* (2013.01); *F21V 23/001* (2013.01); *F21V 23/06* (2013.01); *F21V 33/0096* (2013.01); *F21W 2131/30* (2013.01)

(58) Field of Classification Search

None

See application file for complete search history.

(56) References Cited

U.S. PATENT DOCUMENTS

| | | | | |
|---|---|---|---|---|
| 6,997,740 B2 * | 2/2006 | Kerr | F04D 29/601 | 439/537 |
| 8,215,920 B2 * | 7/2012 | Criner | F04D 29/601 | 248/343 |
| 8,354,948 B2 * | 1/2013 | Priest | G08C 17/02 | 341/176 |
| 10,890,191 B2 * | 1/2021 | Broughman | F04D 29/601 | |
| 2002/0111063 A1 * | 8/2002 | Kerr | F04D 25/088 | 439/545 |
| 2010/0134341 A1 * | 6/2010 | Priest | G08C 17/02 | 341/176 |
| 2010/0329885 A1 * | 12/2010 | Criner | F04D 29/601 | 248/343 |
| 2015/0090858 A1 * | 4/2015 | Broughman | F21V 21/03 | 248/674 |

* cited by examiner

*Primary Examiner* — Juan G Flores

(74) *Attorney, Agent, or Firm* — The Concept Law Group, PA; Scott D. Smiley

(57) ABSTRACT

A single-step mechanical/electrical ceiling fan/light mounting assembly includes a below-the-ceiling junction box having a first half of a mechanical couple and a first half of an electrical couple, a cover assembly that has a ceiling fan mounting bracket, a second half of the mechanical couple that is shaped to mate with the first half of the mechanical couple, a second half of the electrical couple that electrically couples with the first half of the electrical couple as the second half of the mechanical couple mates with the first half of the mechanical couple, and a ceiling fan power connector electrically connected to the second half of the electrical couple.

15 Claims, 12 Drawing Sheets

ONE-STEP MECHANICAL AND ELECTRICAL MOUNTING BRACKET FOR CEILING FANS AND LIGHTS

CROSS-REFERENCE TO RELATED APPLICATION

This application claims priority to U.S. Provisional Patent Application No. 63/475,612 filed Nov. 25, 2022, U.S. Provisional Patent Application No. 63/577,286 filed Apr. 14, 2023, and U.S. Provisional Patent Application No. 63/577,396 filed Apr. 24, 2023, the entireties of which are all incorporated herein by reference.

FIELD OF THE INVENTION

The present invention relates generally to ceiling fans, and, more particularly, relates to devices, systems, and methods of installing ceiling fans and lights with a bracket that mechanically and electrically connects to a ceiling in a single step.

BACKGROUND OF THE INVENTION

Mounting a fan and/or light on the ceiling can be difficult for a number of reasons, especially for individuals who may not have experience or familiarity with electrical work and home improvement tasks, balance, and/or great strength. First, ceiling fans are heavy and bulky, which makes handling and positioning them while on a ladder or scaffold challenging. Fear of heights can interfere with the ability to concentrate and perform tasks safely. The risk of accidents or injuries due to the fan's weight and height increases if one does not have the right tools and assistance. Thus, there is a need to reduce the amount of time one is on a ladder bearing the weight of a fan and/or light fixture and the time required to work with the fan and/or light fixture to install it.

Second, properly (securely) mounting the fan to the ceiling is crucial for its stability and safety. This may involve locating a structural support member above the ceiling, such as a 2×4 board, drilling holes, securing brackets, and installing/using a ceiling-fan-rated electrical box. Without the necessary tools and expertise, it can be challenging to ensure a secure and stable installation.

Third, ceiling fans require electrical connections to function. Once the fan is near the ceiling, at least two and, generally, three electrical wires must be connected from the fan to wires running through the ceiling. This typically requires the installer to twist three sets of two wires together, install wire nuts to secure them, and then hide/stow the wires and wire nuts into a small space. Incorrect wiring or securing the wires can lead to short circuits, electrical shocks, or even fires. Thus, if one is not sufficiently skilled and trained in working with electrical wiring and connections, it can be dangerous to attempt the installation on one's own.

Fourth, electrical work in homes must adhere to specific codes and regulations to ensure safety. Failing to comply with these codes can result in hazards and may also lead to potential legal issues. However, many if not most installations are done by do-it-yourselfers ("DIYers"), which are homeowners with limited experience and skill sets for electrical connections, which poses a greater risk for safety concerns, such as ladder falls (the number 1 cause of accidents according to the CDC, for both residential and commercial areas), potential fire hazards from making improper electrical connections, and electrocution. Given these potential challenges and risks, many homeowners prefer to hire a professional electrician or handyman to install their ceiling fans, which comes with significant cost and consumption of time making the appointment and ensuring the homeowner is home at and during the appointment time. With the above in mind, there needs to be a better way to avoid and/or replace these dangerous and antiquated methods found in the installation of ceiling fans.

One attempt to improve the traditional method of installing ceiling fans is disclosed in U.S. Pat. No. 9,394,919 (hereinafter, "the '919 patent"). The '919 patent teaches a standard junction box that is installed above the ceiling surface and that contains electrical wires that can supply power to the to-be-installed fan. A special bracket is then attached via screw or bolts to the above-the-ceiling junction box, the special bracket having a standard horizontally oriented socket that receives a standard ceiling-fan mounting ball joint that provides the fan a range of movement during operation. The '919 patent's bracket is unique in that it has a wire terminal coupled thereto. Specifically, wires from the ceiling are terminated into a connector plug half (either male or female) that is attached to the '919 patent's bracket. Prior to attaching the heavy fan, its wires are terminated into the other half of the connector plug. Thus, the '919 patent's bracket allows the fan to be lifted into place so the ball joint mates with the socket and then the fan motor is electrically connected to the power source via the two plug halves.

A drawback to the invention described in the '919 patent is that the ceiling fan connector bracket (the part that physically supports the fan) is now hardwired and physically bolted to the ceiling. Thus, if one wanted to, for example, replace their ceiling fan with a light fixture, i.e., no longer have a fan in that location, they would have to disconnect the electrical connector halves, carry the heavy fan and motor down to the floor level, return to the ceiling to cut off the connector half attached to the wires coming from the ceiling, and then mechanically remove the connector bracket by removing the screws or bolts attaching it to the above-the-ceiling electrical junction box. They would then have to strip the wires coming from the ceiling so they can be coupled to the to-be-installed light fixture.

To further complicate the wiring requirement, many ceiling fans that use remote control operation require that a separate remote control receiver module be inserted inside the ceiling fan mounting bracket and in a limited space or gap between the ball end of the down rod and the inside top of the fan mounting bracket. The addition of this control module, that needs to be hard wired to a power supply further exacerbates the difficulty by adding additional wiring connections to be made other than for the fan motor and light. This also now requires an even greater skill set to understand and determine what wires are to be connected to the new lead wires that are coming from the added remote-control module. This adding of the remote-control module function increases the number of electrical connections needed and can easily double these connections by having to make up to seven electrical connections for the remote-control functioning of a fan. This now adds considerable time to the installation, while up on a ladder, and increases the complexity of making secure and safe electrical code-compliant connections.

In a few cases, the receiver module is mounted inside of the decorative ceiling fan's motor housing, or other decorative covering on the fan and light body so that it was hidden from view, but due to the limited space inside decorative fan enclosures for the receiver module, this practice is not widely used.

Currently, to install a receiver module onto a ceiling fan bracket (or other types of brackets, e.g., for lights), it must be inserted into a narrow opening within the bracket that is attached to a ceiling member for support. The ability to insert a receiver module, especially in lighted ceiling fans, is limited due to variations in clearance between the various manufacturers' bracket openings and the different receiver modules' overall encasement size. The addition of the receiver module increases the need for installers' skill level as well as their electrical wiring liability by doubling the number of wiring connections needed for installation of their light. These factors are sufficient to cause do-it-yourselfers hesitation when purchasing a lighted ceiling fan, knowing they will have to insert a receiver module and figure out how to hard wire all the components and make the correct electrical wiring connections. This process is rather foreboding to most homeowners that desire to end up with remote control capabilities for their lighted fan and, as a result, is a known detriment to installations by DIYers and consequentially to sales for a high-demand product application in the lighting industry.

Also, certain ceiling types, such as vaulted or slopped ceilings can cause the down rod with hanger ball (ball on the end of a ceiling fan's down rod) to crush the receiver module when placed into an angular position inside the hanger bracket. This problem causes the remote functionality to cease. Unfortunately, this issue is only realized after going to the trouble and expense of installation.

Due to these limiting factors associated with the current method and structures for placement of a separate add-on receiver module in a hanger bracket of a lighted ceiling fan, there is a need for a new approach that includes better opportunities to locate the receiver module that will minimize space issues, wiring complications, and other liabilities and restrictions present with prior-art solutions. There is a clear need for a more universal mounting system, method, and apparatus for remote control module placement in ceiling fans.

Therefore, a need exists to overcome the problems with the prior art as discussed above.

SUMMARY OF THE INVENTION

The invention provides a one-step mechanical and electrical mounting bracket for ceiling fans that overcomes the hereinafore-mentioned disadvantages of the heretofore-known devices and methods of this general type and that, with a single motion, mechanically and electrically couples a ceiling fan mounting bracket to a below-the-ceiling junction box.

With the foregoing and other objects in view, there is provided, in accordance with the invention, a single-step mechanical/electrical ceiling fan/light mounting assembly that includes a below-the-ceiling junction box having a first half of a mechanical couple and a first half of an electrical couple and a cover assembly that includes a ceiling fan mounting bracket, a second half of the mechanical couple that is shaped to mate with the first half of the mechanical couple, a second half of the electrical couple that electrically couples with the first half of the electrical couple as the second half of the mechanical couple mates with the first half of the mechanical couple, and a ceiling fan electrical connection port electrically connected to the second half of the electrical couple.

In accordance with another feature, the first half of the mechanical couple mates with the second half of the mechanical couple when the ceiling fan and light mounting bracket is physically coupled to and rotated relative to the above-the-ceiling junction box.

In accordance with a further feature of the present invention, the below-the-ceiling junction box includes a wire terminal block that physically couples at least two wires originating from outside the below-the-ceiling junction box to a wire terminal block on the cover assembly.

In accordance with yet another feature of the present invention, the term "outside the below-the-ceiling junction box" means "an area located above a ceiling that the below-the-ceiling junction box is coupled to."

In accordance with one more feature of the present invention, the ceiling fan mounting bracket is a ball socket.

In accordance with an additional feature of the present invention, a remote-controlled controller is located between the ceiling fan electrical connection port and the first half of the electrical couple.

In accordance with another feature of the present invention, the single-step mechanical/electrical ceiling fan mounting assembly includes a light fixture mounting bracket that has a second half of the mechanical couple that is shaped to mate with the first half of the mechanical couple, a second half of the electrical couple that electrically couples with the first half of the electrical couple as the second half of the mechanical couple mates with the first half of the mechanical couple, and a light emitting element electrically coupled to the second half of the electrical couple.

In accordance with the present invention, a single-step mechanical/electrical ceiling fan/light mounting method includes the steps of mounting a below-the-ceiling junction box having a first half of a mechanical couple and a first half of an electrical couple to a ceiling, electrically coupling the first half of the electrical couple to a power source, and mechanically and electrically mating to the below-the-ceiling junction box a cover assembly that includes a second half of the mechanical couple that is shaped to mate with the first half of the mechanical couple, a second half of the electrical couple that electrically couples with the first half of the electrical couple as the second half of the mechanical couple mates with the first half of the mechanical couple, a ceiling fan mounting bracket, and a ceiling fan electrical connection port electrically connected to the second half of the electrical couple.

In accordance with the present invention, the mating step of the single-step mechanical/electrical ceiling fan/light mounting method includes physically rotating the cover assembly with relation to the above-the-ceiling junction box until the first half of the mechanical couple mates with the second half of the mechanical couple.

In accordance with another feature, an embodiment of the present invention also includes a wire terminal block that physically couples at least two wires originating from outside the below-the-ceiling junction box to a wire terminal block on the ceiling fan mounting bracket.

In accordance with yet another feature, an embodiment of the method of present invention includes providing a remote-controlled controller between the ceiling fan electrical connection port and the first half of the electrical couple.

In accordance with a further feature of the present invention, the ceiling fan mounting bracket is a ball socket.

In accordance with another feature of the present invention, the single-step mechanical/electrical ceiling fan mounting assembly method includes the step of replacing the cover assembly with a light fixture mounting bracket that has a second half of the mechanical couple that is shaped to mate with the first half of the mechanical couple, a second half of the electrical couple that electrically couples with the first half of the electrical couple as the second half of the mechanical couple mates with the first half of the mechanical couple, and a light emitting element electrically coupled to the second half of the electrical couple.

Although the invention is illustrated and described herein as embodied in a one-step mechanical and electrical mounting bracket for ceiling fans, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up," "down," "left," "right," "inside," "outside," "front," "back," "head," "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. Those skilled in the art can understand the specific meanings of the above-mentioned terms in the embodiments of the present invention according to the specific circumstances.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
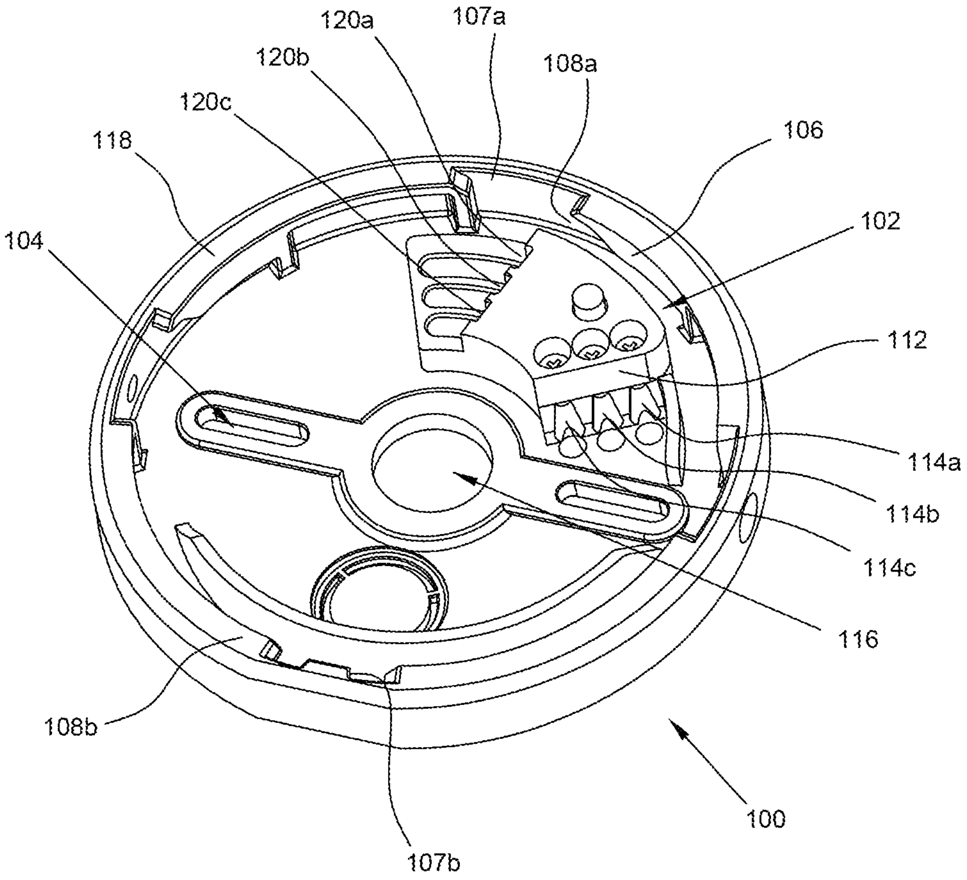
FIG. 1 is a perspective view of the interior of a below-the-ceiling junction box, in accordance with the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient ceiling fan and/or lighting fixture mounting assembly, system, and method. Embodiments of the invention provide two mating components that, when connected, simultaneously establish a mechanical and electrical connection with one another. In addition, embodiments of the invention provide a ceiling fan mounting bracket that physically supports a hanging ceiling fan (flush type or pole type) and/or lighting fixture and can contain a remote control receiver that controls the fan/light.

Figure 2:
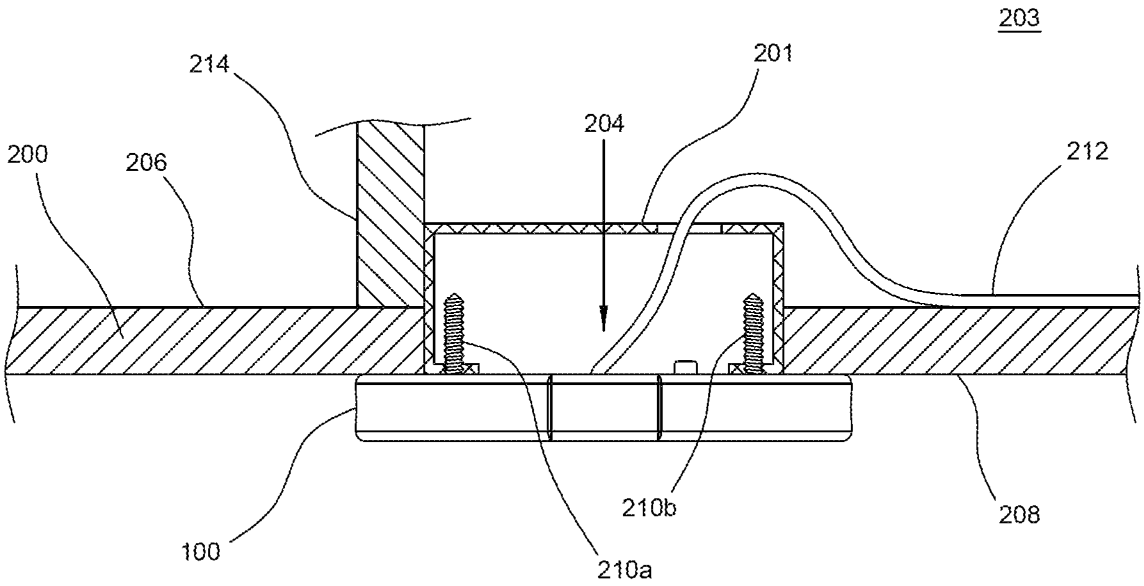
FIG. 2 is an elevational side view of the below-the-ceiling junction box of FIG. 1 coupled to a ceiling, in accordance with the present invention.

Referring now to FIG. 1, one embodiment of the present invention is shown in a perspective view of the inside of a below-the-ceiling junction box 100. FIG. 1 shows several advantageous features of the present invention but, as will be described below, the invention can be provided in several shapes, sizes, combinations of features and components, and varying numbers and functions of the components. The first example of a below-the-ceiling junction box 100, as shown in FIG. 1, includes an interior area 102. This interior area 102 includes at least one location 104, which is an aperture for anchoring the below-the-ceiling junction box 100 to a ceiling, as will be described below and is illustrated in FIG. 2. There can be multiple locations 104 within the interior area 102 for this purpose. The interior area 102 of the below-the-ceiling junction box 100 also includes a first half of a mechanical couple 106. As illustrated in FIG. 1, the first half of the mechanical couple 106 is a receiving portion 107*a* that transitions into a slanted female receiving slot 108*a* along an inner surface of an outer edge 118 of the below-the-ceiling junction box 100. The mechanical couple 106 is able to receive a male portion of another mechanical part, which will be described below and illustrated in FIGS. 1-8. The first half of the mechanical couple 106 has a second receiving portion 107*b* and a second slanted female receiving slot 108*b* opposite the receiving portion 107*a* and slot 108*a*, which also receives a male portion of a mechanical part, as described below. The below-the-ceiling junction box 100 can have additional receiving portions and female receiving slots as well, in some embodiments, there are four. In other embodiments, the mechanical couple 106 can be male and couple to a female portion of another part of the present invention that features the female portions.

The interior area 102 of the below-the-ceiling junction box 100 also features a first half of an electrical couple 112. The particular embodiment of the first half of the electrical couple 112 of FIG. 1 is illustrated as a terminal block that has three wire terminals 114*a-c*. The terminal block is not limited to only three wire terminals. In the embodiment illustrated, the wire terminals 114*a-c* are standard electrical wire receivers that accept the stripped end of insulated wires (not shown) and provide gripping tension that prevents the wires from being released from the terminal block 112, absent significant force or release via a mechanical release mechanism that must be manually manipulated, e.g., pushed with a tool or unscrewed. The first half of the electrical couple 112 can be provided in other embodiments as well with different structures for securing wires. The electrical connections can be done by secure engagement of contact surfaces alone, not only being made by male and female prongs or blades.

Figure 6:
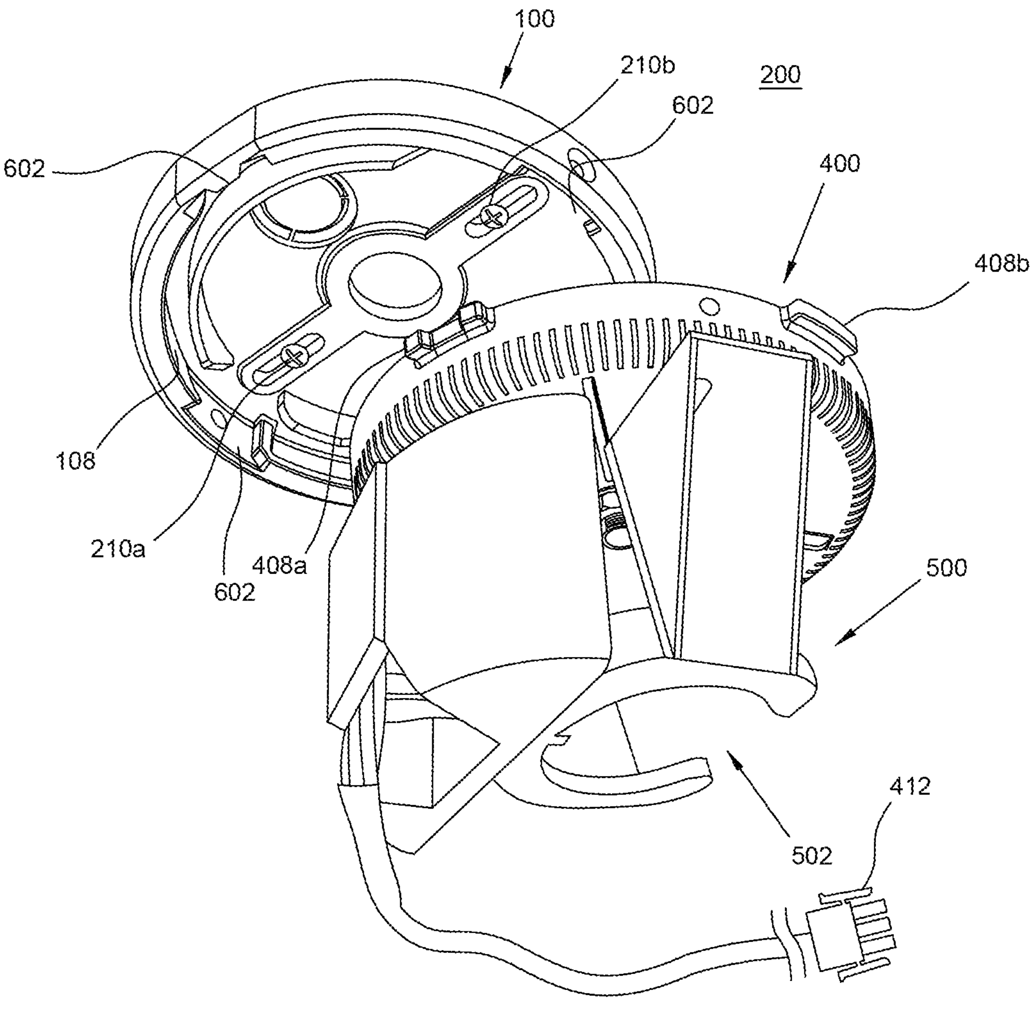
FIG. 6 is a perspective upward-looking view at the below-the-ceiling junction box of FIG. 1 coupled to a ceiling and the cover of FIGS. 4 and 5 in close proximity thereto, prior to coupling, in accordance with the present invention.
Figure 7:
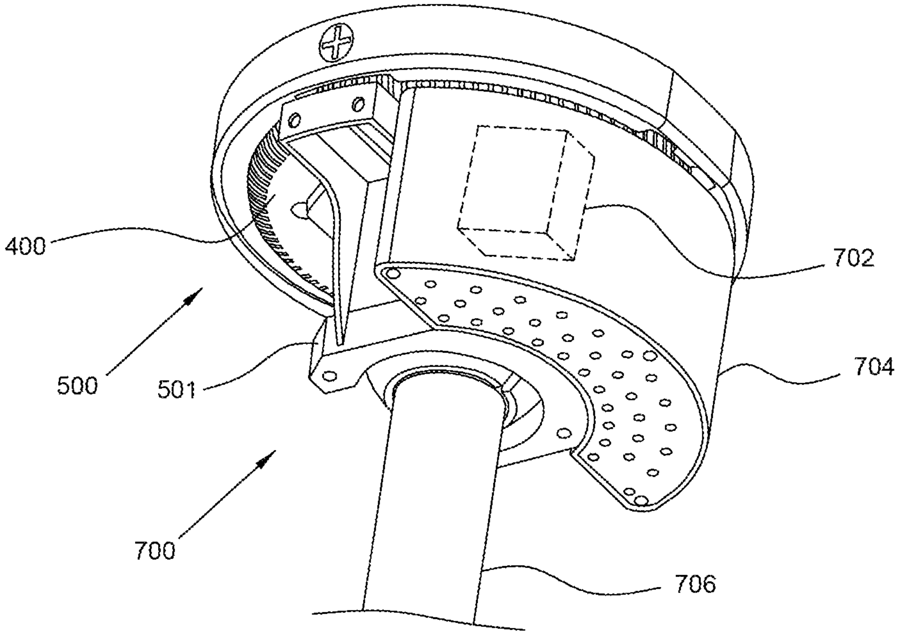
FIG. 7 is a perspective upward-looking view of the below-the-ceiling junction box of FIG. 1 coupled to the cover of FIGS. 4 and 5, in accordance with an exemplary embodiment of the present invention.
Figure 8:
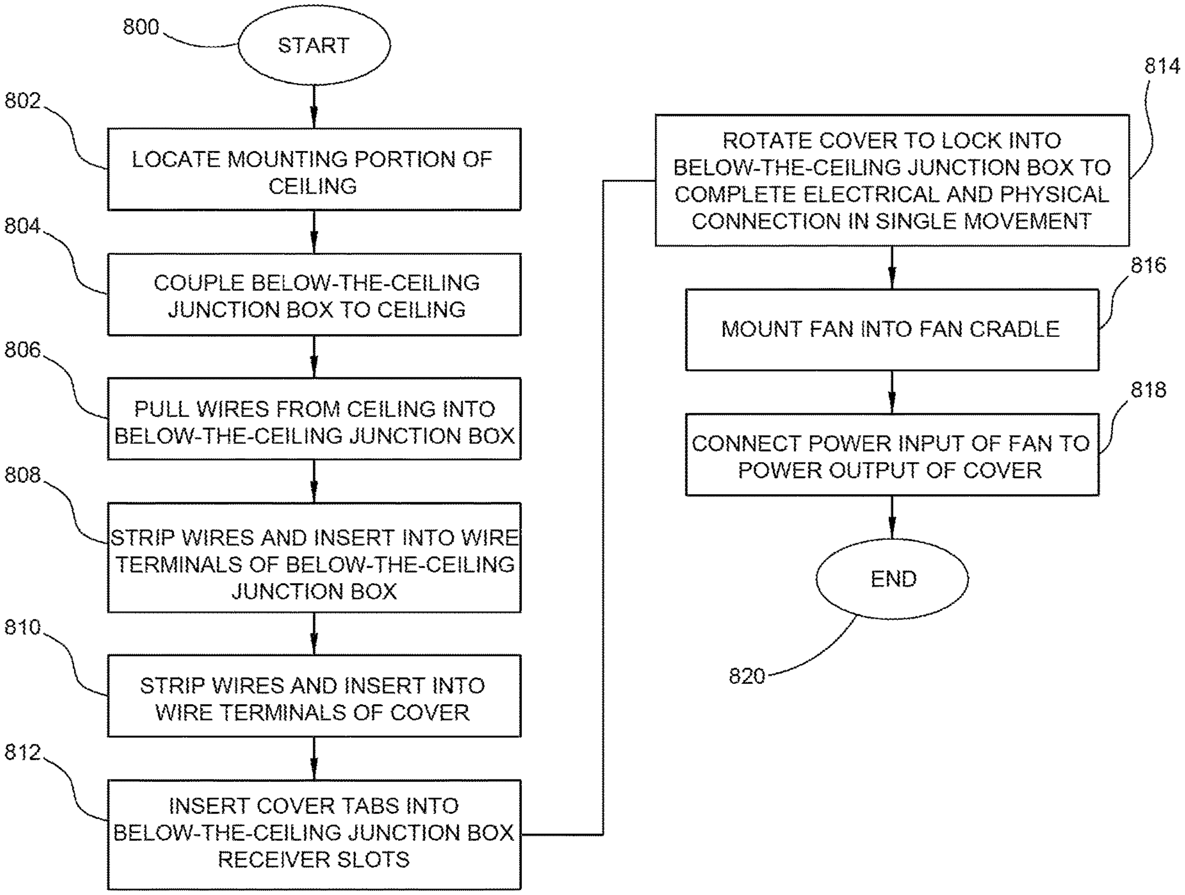
FIG. 8 is a process flow diagram showing an exemplary method of electrically and mechanically coupling a fan to a ceiling in a single step, in accordance with an exemplary embodiment of the present invention.
Figure 9:
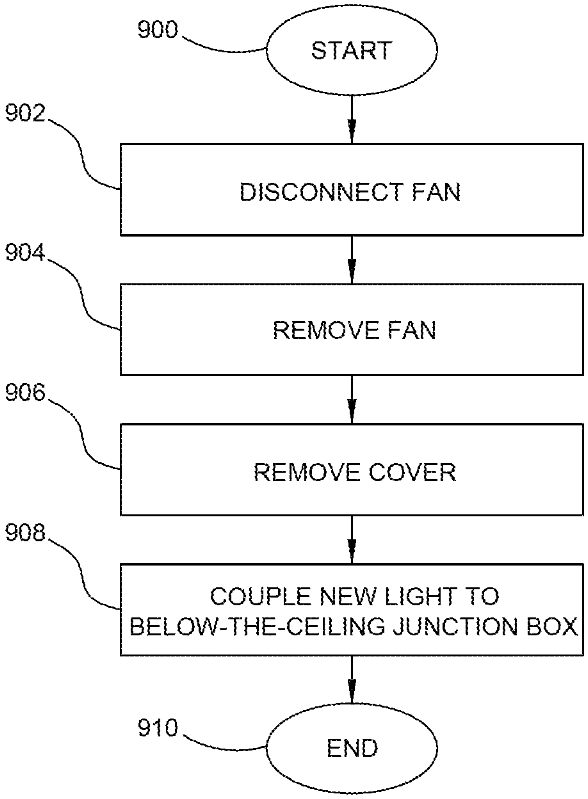
FIG. 9 is a process flow diagram showing an exemplary method of electrically and mechanically decoupling a fan from a ceiling in a single step and electrically and mechanically coupling a light fixture to a ceiling in a single step, in accordance with an exemplary embodiment of the present invention.

FIGS. 1-7 and 10 will be described in conjunction with the process flow chart of FIGS. 8 and 9. Although FIGS. 8 and 9 show a specific order of executing the process steps, the order of executing the steps may be changed relative to the order shown in certain embodiments. Also, two or more blocks shown in succession may be executed concurrently or with partial concurrence in some embodiments. Certain steps may also be omitted in FIGS. 8 and/or 9 for the sake of brevity. In some embodiments, some or all of the process steps included in FIGS. 8 and 9 can be combined into a single process.

Referring now primarily to FIGS. 2 through 7, as well as the flow chart in FIG. 8, the process for installing the below-the-ceiling junction box 100 starts at step 800 and proceeds with step 802, where a mounting portion 204 of the ceiling 200 is located by the user/installer. The term "user" will be used herein below to describe the individual installing the below-the-ceiling junction box 100; however, it should be understood that the user may be an electrician or may be the homeowner or other building resident that is intended to utilize the fan (or any apparatus that is installed). As used herein, the term "mounting portion 204" is intended to indicate a portion of the ceiling 200 on which the below-the-ceiling junction box 100 is intended to be positioned, affixed, or otherwise coupled to. In one embodiment, the mounting portion 204 of the ceiling 200 is below a standard pre-existing above-the-ceiling junction box 201. In one embodiment, the mounting portion 204 of the ceiling 200 includes a first surface 206 and a second surface 208. The first surface 206 may be opposite the second surface 208. The first surface 206 may be considered an "above-the-ceiling" surface and the second surface 208 may be considered a "below-the-ceiling" surface 208, each defining where a "below-the-ceiling" and "above-the-ceiling" area starts. That is, anywhere above the first surface is considered "above-the-ceiling" and anywhere below the second surface 208 is considered "below-the-ceiling," including walls.

In step 804, the below-the-ceiling junction box 100 is coupled to the above-the-ceiling junction box 201, which is, itself, secured to a structure 214 in the above-the-ceiling area 203. The structure 214 is able to support a ceiling fan. Such structures are generally rafters that run the length of the ceiling, but the structure 214 can include any similar support structure sufficient to hold a standard ceiling fan. In the embodiment shown in FIG. 2, a pair of screws 210*a* and 210*b* pass through apertures 104 in the below-the-ceiling junction box 100 and through portions of the above-the-ceiling junction box 201 to secure the below-the-ceiling junction box 100 to the above-the-ceiling junction box 201, leaving the below-the-ceiling junction box 100 flush against the bottom surface 208 of the ceiling 200.

In step 806, which can also take place prior to step 804, wires 212 originating above the ceiling and being present inside of the above-the-ceiling junction box 201 are routed through wire aperture 116 (shown in FIG. 1) of the below-the-ceiling junction box 100. The wires 212 include positive lead 1002 (often referred to as the "hot" lead) and negative lead 1004 (often referred to as the "ground" lead) (shown in FIG. 10) coupled to an A/C power source on the other end of wires 212. In most embodiments, a neutral wire 1006 is also part of the wires 212.

Figure 11:
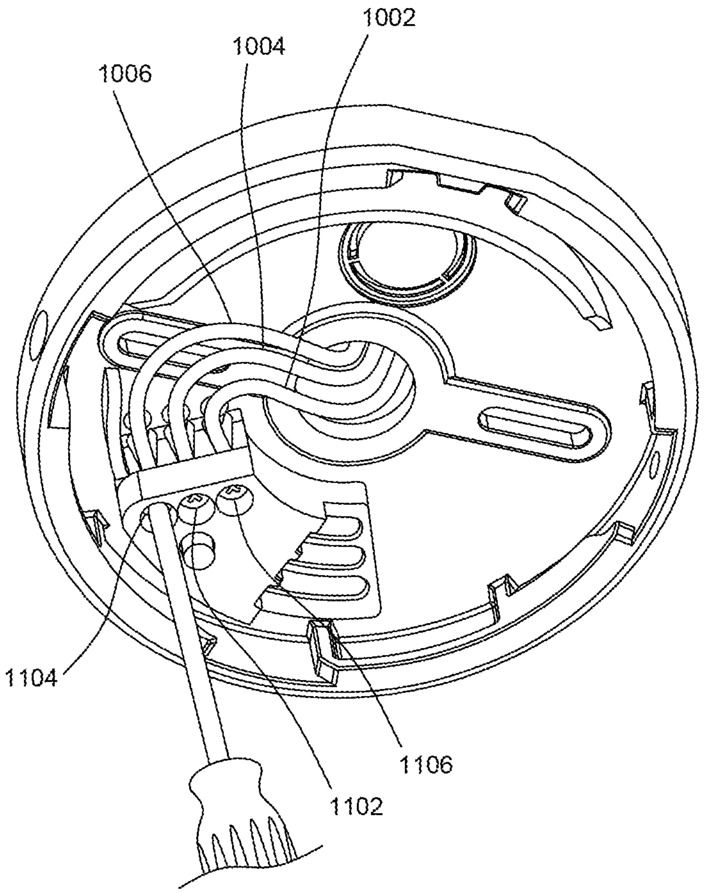
FIG. 11 is a perspective upward-looking view of the interior of the below-the-ceiling junction box showing the terminal block with screws to secure the wires coming from above the ceiling, in accordance with the present invention.

In step 808, insulation from a first one 1002 of the wires 212 is stripped and the first wire 1002, e.g., hot lead, is inserted into a first one of the three wire terminals 114*a-c*. In step 808, insulation from a second one 1004 of the wires 212 is stripped and the second wire 1004, e.g., ground lead, is inserted into a second one of the three wire terminals 114*a-c*. Also in step 808, insulation from a third one 1006 of the wires 212 is stripped and the third wire 1006, e.g., neutral lead, is inserted into a third one of the three wire terminals 114*a-c*. As is illustrated in FIG. 11, the wires 1002, 1004, 1006 can be secured by tightening screws 1102, 1104, 1106 or with a common mechanism that asserts clamp or spring pressure against the wires and prevents them from being pulled out without a release mechanism being manipulated, usually, with a separate tool.

Figure 3:
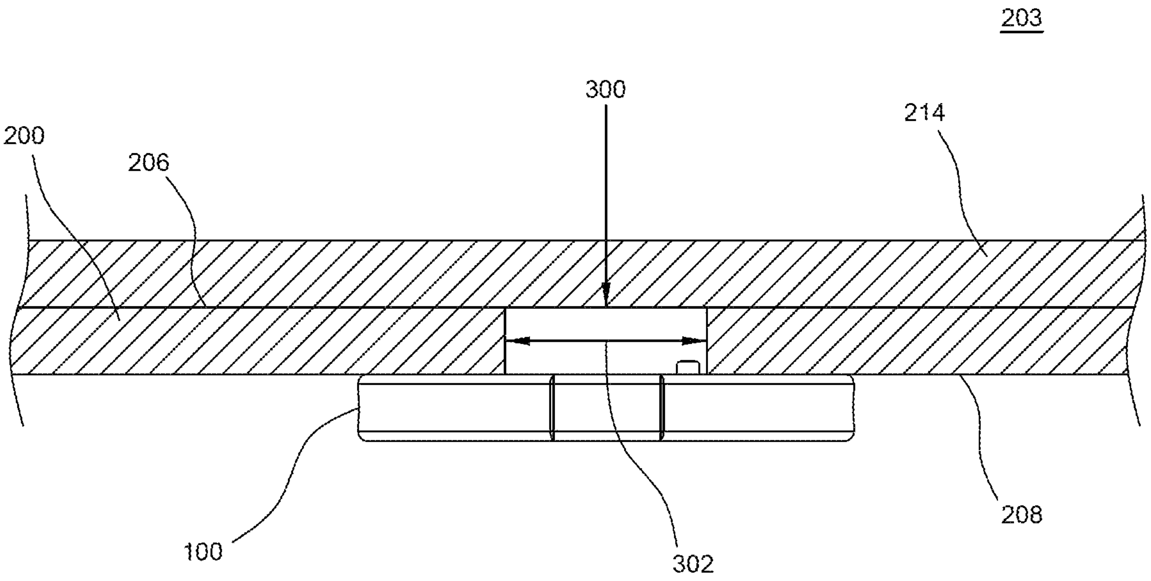
FIG. 3 is an elevational side view of the below-the-ceiling junction box of FIG. 1 coupled to a ceiling and a support structure within the ceiling, in accordance with the present invention.

In alternative embodiments, as shown in FIG. 3, the below-the-ceiling junction box 100 can be attached directly to a support structure 214 without the need for an above-the-ceiling junction box 201 (shown in FIG. 2). In this embodiment, an aperture 300 may be created by the user within the mounting portion 204 (shown in FIG. 2), forming a through-hole 300 extending through the first surface 206 and the second surface 208. The aperture 300 is preferably of a relatively small diameter, labeled 302 in FIG. 3, as compared to conventional ceiling holes for conventional ceiling mounted fan/light assemblies that couple to above-the-ceiling junction boxes 201. In a preferred embodiment, the aperture 300 is sized and shaped to insert at least one electrical conductor 212 therethrough from the above-the-ceiling area 203. In one embodiment, the aperture 300 is sized to be no greater than 2 inches at its greatest width. In another embodiment, the aperture 300 is sized to be no greater than 1 inch at its greatest width. In other embodiments, the aperture 300 may be outside of these ranges. The aperture 300 may be created by any known method or device, such as, for example, a drill. In this embodiment, screws, such as wood screws, could be used to attach the below-the-ceiling junction box to a support structure 214 in the above-the-ceiling area 203. Once attached, the wires are stripped and terminated in the terminal block 112 as described above.

Figure 4:
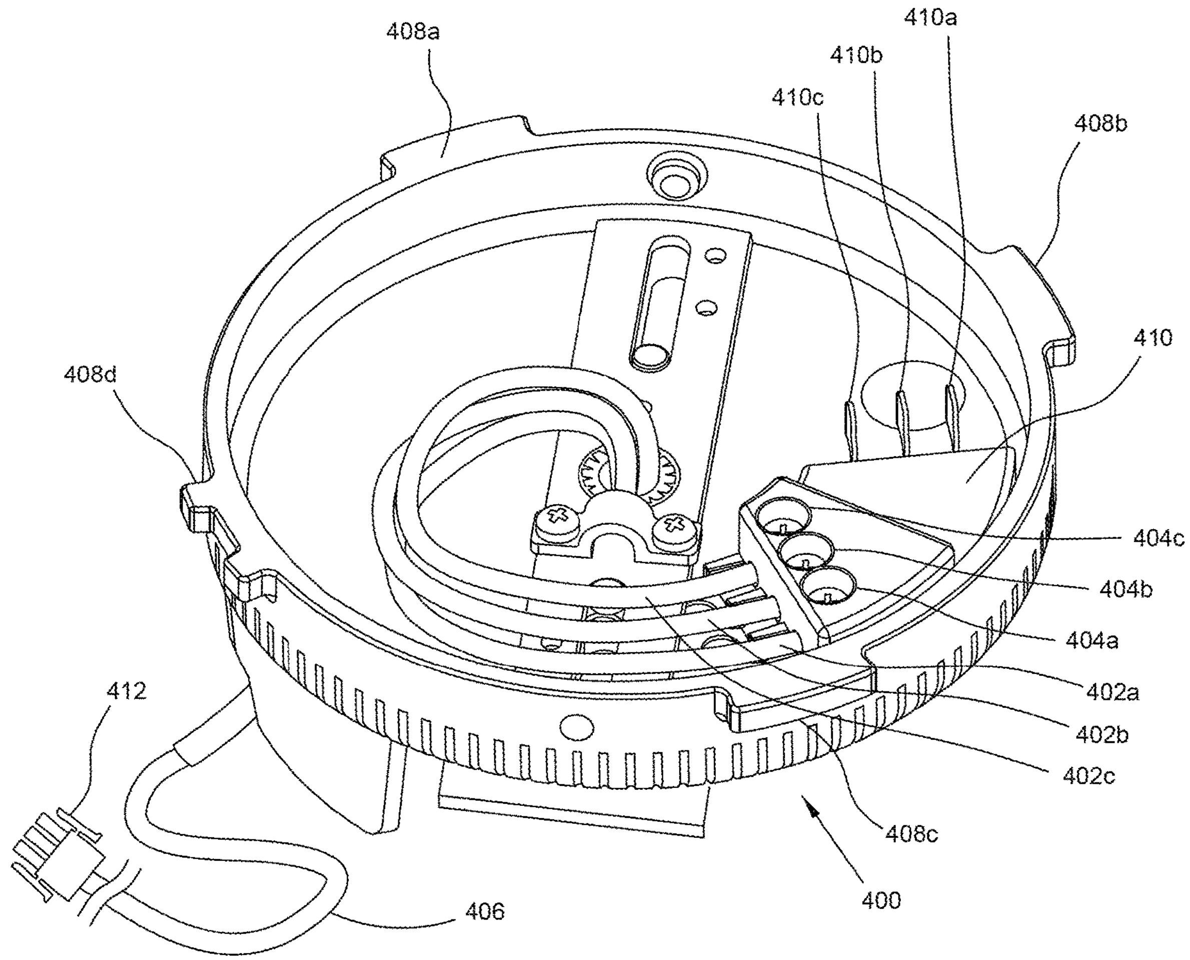
FIG. 4 is a perspective view of the interior of a cover for the below-the-ceiling junction box of FIG. 1, in accordance with the present invention.

FIG. 4 shows a bottom cover 400 that attaches to the below-the-ceiling junction box 100. The bottom cover 400 includes a set of tabs 408*a-d*. Although four tabs 408*a-d* are shown in FIG. 4, the invention is not limited to four and can have less than or more than four. The tabs 408*a-d* are sized and shaped to fit within receiving portions 107 and mate with the female receiving slots 108 shown in FIG. 1. There can be more female receiving slots, e.g., one that corresponds to each tab 408*a-d*. Once the bottom cover 400 is inserted into the below-the-ceiling junction box 100, the tabs 408*a-d* are received within receiving areas 107 at the openings of the receiving slots 108 and a turning motion of the cover 400 mechanically couples the tabs 408*a-d* into the receiving slots 108. Any wires coming into the below-the-ceiling junction box 100 (other than wires coming directly from an above-the-ceiling electrical junction box) must be secured with Code compliant electrical wire clamping devices (such as ROMEX connectors or pipe clamps) required by the NEC for the types of electrical wires normally used for fans and lights. The below-the-ceiling junction box 100's incoming power wire "holes" are designed to accommodate the NEC approved and commonly used wire clamping devices for electrical wires. This again provides additional Code compliance for users with regard to the code compliant and safety issues required for connecting wires into electrical junction boxes.

The cover 400 also has an electrical termination block 410. The termination block 410 in the cover 400 is similarly structured as the termination block 112 shown in FIG. 1. That is, the termination block 410 has connection receivers 404*a-c* capable of separately receiving three wires 402*a-c*, e.g., black, white, and neutral, from a power bundle 406 with a power connector 412. The power connector 412 can be a standard plug connector that is sized and shaped to match a companion power connector of a fan (not illustrated). For example, if the power connector 412 is a female, the power connector of the fan is a corresponding male plug. Therefore, returning the process flow diagram of FIG. 8, in step 810, an end of wire 402*a* is stripped and inserted into the first wire terminal 404*a*. In that same step, an end of a second one of the wires 402*b* is stripped and the second wire 402*b* is inserted into a second one of the three wire terminals 404*b* and, if a neutral wire is present, an end of the neutral wire 402*c* is stripped and the third/neutral wire 402*c* is inserted into a third one of the three wire terminals 404*c*. The wires 402*a-c* can be secured by tightening screws (shown in FIG. 4) or with a common mechanism that asserts spring pressure against the wires and prevents them from being pulled out without a release mechanism being manipulated or significant pulling force. The termination block 410 in the cover 400 can also serve as a connector for a remote-control. Wires 212 supply power to the assembly, including, e.g., WIFI, RF, Bluetooth, and more. In some embodiments, the end user does not need to complete step 810 because this step occurs at the manufacturer so that the cover is provided to the end user with wire 406 pre-installed/pre-terminated in terminal block 410. In other embodiments, the present invention is a retrofit product and the user will make these wire connections themselves when they retrofit a common "off the shelf" fan or light they have purchased and one that is not OEM prepared or connected. In this embodiment, the present invention is a stand-alone product that is easily adaptable to existing lights or fans without pre-existing OEM connections. In addition, components, such as wireless receivers can also be connected to the wires 402*a-c* directly and without using the terminal block 410. The terminal block 401 in the cover 400 of the below-the-ceiling junction box 100 can also serve as a connector for a remote-control receiver and/or other device capable of wireless communication, e.g., WIFI, RF, Bluetooth, and more. The terminal block 410 can have additional receiving ports in addition to the illustrated ports 404*a-c*. These additional ports can facilitate the connections the additional alternative components described above.

Figure 5:
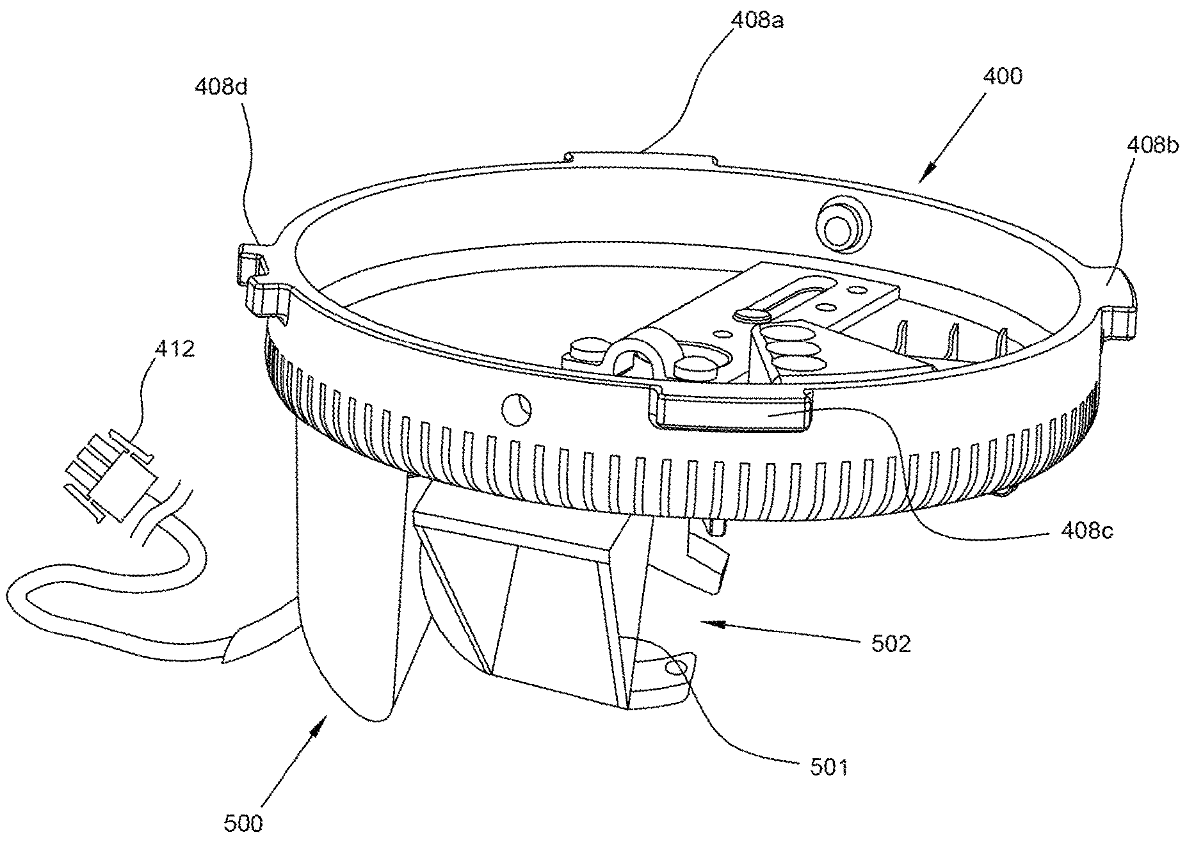
FIG. 5 is a perspective side view of the cover of FIG. 4 with a fan mount bracket attached thereto, in accordance with the present invention.

FIG. 5 shows a perspective side view of a cover assembly 500, which includes the cover 400 of FIG. 4, and a ceiling fan mounting bracket 501 attached to the bottom of the cover 400. The ceiling fan mounting bracket 501 is any structure that can hold a fan proximate to a ceiling and, in the particular embodiment shown in FIG. 5, includes a socket 502 that is shaped and sized to receive a standard ball connector (not shown) that is present on most common down rod ceiling fans' support shafts. The socket 502 provides a cradle that holds a standard fan's ball connector securely, while also allowing it to rotate/move within the socket 502. The rotation/movement is the natural result of the fan being in operation and the blades rotating, causing the fan to move. In other embodiments, the socket 502 is not required and the mounting bracket 501 has a thin profile that accepts standard flush-mount ceiling fans or lights and is a light fixture mounting bracket.

FIG. 6 shows the below-the-ceiling junction box 100 attached to a ceiling 200 and the cover 400 being proximal to the below-the-ceiling junction box 100 in preparation for the cover 400 to be installed into the below-the-ceiling junction box 100. In this step 812, at least two of the tabs 408*a-d* are aligned with and placed inside of entry points 602 of the female receiving slots 108. In step 814, the cover is rotated so that the male tabs 408*a-d* are forced into the tapered portions of the female receiving slots 108*a-b* until the cover is secured, i.e., will not separate from the below-the-ceiling junction box 100 without purposeful force/manipulation by a user. In some embodiments, the female receiving slots 108*a-b* have a portion that receives the tabs 408*a-d* and will not release them without an additional physical movement or tool. For example, a button may need to be pressed to release them or a force may need to be applied, e.g., pushing the cover further into the below-the-ceiling junction box 100 similar to a medication bottle.

At the same time as the tabs 408*a-d* are mechanically coupled to the female receiving slots 108*a-b*, the terminal block 112 of the below-the-ceiling junction box 100 makes an electrical couple to the terminal block 410 of the cover 400. This single-step electrical/physical coupling, in accordance with one embodiment, is facilitated by a first plurality of terminal connectors 410*a-c* that are part of the terminal block 410 in the cover 400. Correspondingly, the terminal block 112 of the below-the-ceiling junction box 100 has a second plurality of terminal connectors 120*a-c*. When the cover 400 is placed into the below-the-ceiling junction box 100 and rotated to physically couple with the below-the-ceiling junction box 100, the plurality of terminal connectors 410*a-c* are physically aligned with and mate with the second plurality of terminal connectors 120*a-c*. This coupling places wire terminal 114*a* of the below-the-ceiling junction box 100 in conductive coupling with wire terminal 404*a* of the cover 400 and thus places a wire terminated in wire terminal 114*a* in conductive communication with a wire 402*a* terminated in terminal 404*a*. Similarly, the coupling places wire terminal 114*b* of the below-the-ceiling junction box 100 in conductive coupling with wire terminal 404*b* of the cover 400 and thus places a wire terminated in wire terminal 114*b* in conductive communication with a wire 402*b* terminated in terminal 404*b*. The coupling also places wire terminal 114*c* of the below-the-ceiling junction box 100 in conductive coupling with wire terminal 404*c* of the cover 400 and thus places a wire terminated in wire terminal 114*c* in conductive communication with a wire 402*c* terminated in terminal 404*c*. It should be noted that the invention is not limited to just three connectors 120*a-c* in the below-the-ceiling junction box 100 or three connectors 404*a-c* in the cover 400. More specifically, additional connectors 404 can be provided in the cover for the purpose of powering additional elements, such as remote controls, additional lighting, and more.

Once installed, the below-the-ceiling junction box 100 and cover 400 form an electrical mounting bracket assembly 700, 1200 that drastically reduces safety risks and provides secure code-compliant electrical power connections. These connections are structured to eliminate the need for the extensive traditional hard wiring process, which can come loose during installation without the installer realizing or can come lose over time after installation, for example, as the fan spins and rocks back and forth. The present invention is a device and method that provides both mechanical support and electrical power supply for the installation of ceiling fans, with or without remote controls and/or other methods of wireless communications (i.e., WIFI, RF, Bluetooth, etc.).

More specifically, the present invention eliminates the need for a separate "receiver module" to be inserted into the hanger bracket or placed behind a decorative housing, as is the only option with the prior art. The present invention provides an entirely new placement, or positioning, for the receiver module that controls the remote-control functioning of various lighting products and lighted ceiling fans. In accordance with one embodiment, which is shown in FIG. 7, the receiver module 702 (operable to receive signals from a remote-control switch) has now been integrated within a compartment 704 of the cover assembly 500. This new location within which to mount the receiver module 702 connects to any downward-emitting light source powered by the electrical mounting bracket assembly 700. One application is on a standard lighted fan bracket assembly configuration where power for the light and its accompaniment wiring is extended down through a common tubular rod 706 connecting the receiver module 702 with a light that is terminally disposed at the distal end of the rod 706 and that emits a downward lighting source at the distal end. Advantageously, the compartment 704 can be removed from the assembly shown in FIG. 7 and replaced with smaller or larger assemblies, as needed to fit whatever components are contained within, e.g., remote control receivers, WIFI receivers and/or transmitters, etc. In one embodiment of the present invention, any electrical component (connected to fan or light) within the compartment 704 attaches (via 412) only to the wires coming up through the tubular rod 706.

As the cover 400 physically attaches and electrically couples (in a single step) to the below-the-ceiling junction box 100 as shown in FIG. 7, the receiver module 702 receives a source of electrical power. When this novel one-step mechanical and electrical coupling occurs, it powers the receiver module 702 to now receive an electrical signal from one of the remote switches sending commands for activation. The benefits of the present invention include reduced time on ladders, less hard wiring for lighting products, additional hard wiring for both fan and lighting products, and ease of use by DIYers.

Figure 12:
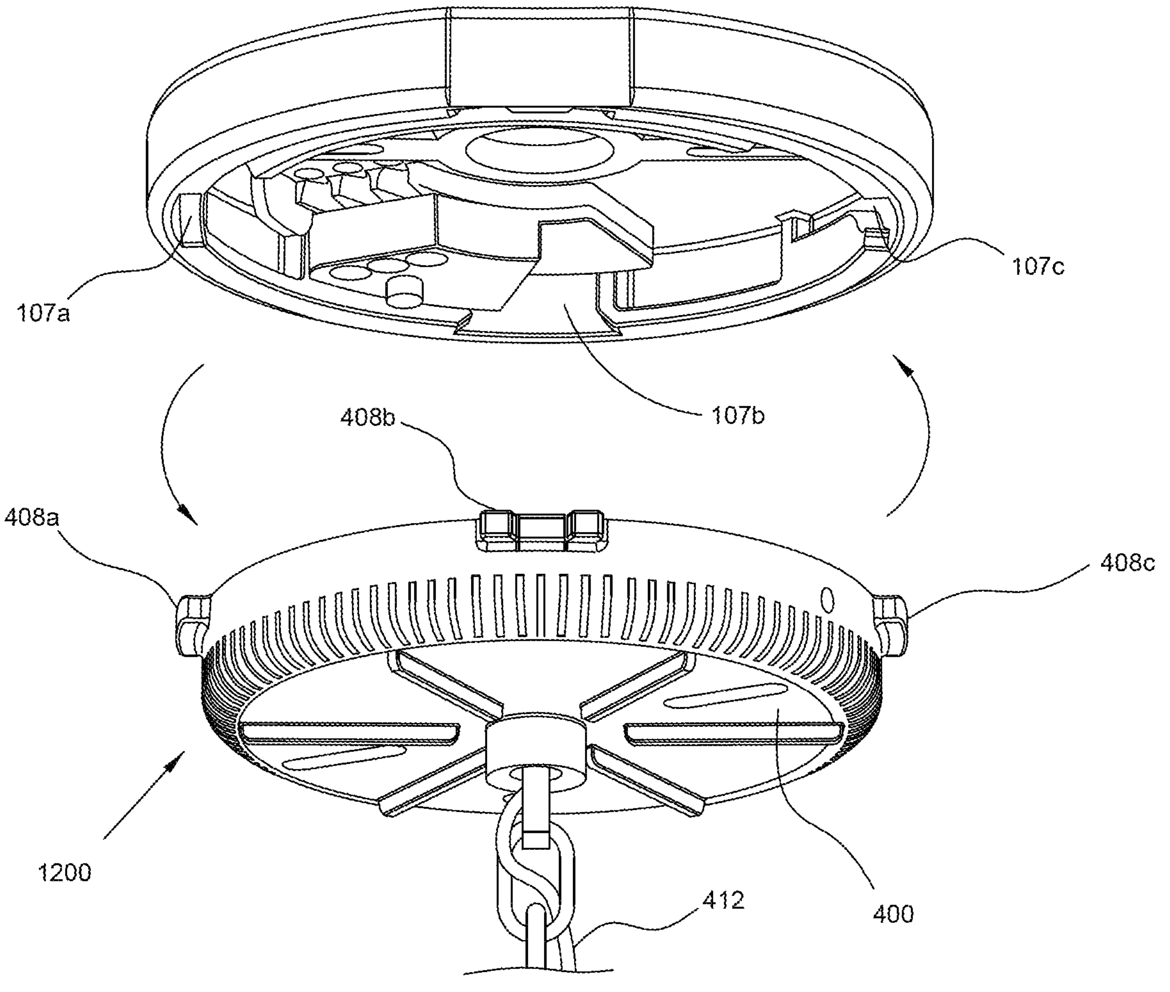
FIG. 12 is a perspective upward-looking view of a cover being physically and electrically attached to the below-the-ceiling junction box of FIG. 11 in a single movement, in accordance with the present invention.

The electrical mounting bracket assembly 1200 shown in FIG. 12 both supports the fan and has the mating electrical plug 412 to connect with the companion plug on the fan when engaged. Referring back to FIG. 8, in step 816, a portion, i.e., ball mount, of the fan (not show in the figures) is inserted within and fully physically supported by the cradle 502. In step 818, when the power input for the fan (not shown in the figures) and the plug 412 of the cover 400 are engaged with one another (twist locked or other type of interlocking method that can engage the two parts securely), the electrical mounting bracket assembly 1200 now has the electrical power onboard and within the assembly to power the fan and light and provide power to built-in electronic components that give the fan remote control and/or wireless communication (i.e. WIFI, RF, Bluetooth, etc.) capability.

The electrical mounting bracket assembly 700 or 1200, formed from the below-the-ceiling junction box 100 and the cover assembly 400, when connected together with a twist locking motion or other type of interlocking method that can engage the two parts securely, provide the weight supporting and electrical power supply (including wireless communication capability) for the operation of a ceiling fan.

The novel electrical mounting bracket assembly 700, 1200 and method for mounting a ceiling fan to the ceiling makes installations much easier and safer. The interconnecting of the electrical power between the electrical mounting bracket assembly 700, 1200 and the ceiling fan motor & light are accomplished by the use of only a "plug" type connector or other embedded electrical wire contacts (no exposed wires) coming from and within the electrical mounting bracket assembly 700, 1200. The electrical mounting bracket assembly 700, 1200 maintains an uninterrupted electrical power connection between the power source (via the below-the-ceiling junction box 100) and the fan motor, light and electronic components without having to make loose, exposed wire end or "hard wire" connections to the fan, light or electronic components when the two component parts are "twist locked" or other type of interlocking method that can engage the two parts securely and joined together.

When the below-the-ceiling junction box 100 has been secured to the ceiling surface 200 and the cover 400 is attached to the below-the-ceiling junction box 100, a fan can be placed within the cradle 502 of the ceiling fan mounting bracket 501 in the penultimate step 816 and the final step 818 is simply connecting the fan to the electrical power source, which can now be accomplished without any "hard wiring" (loose wire end connections) required. The installer simply connects the plug 412 to a corresponding plug in the fan.

Figure 10:
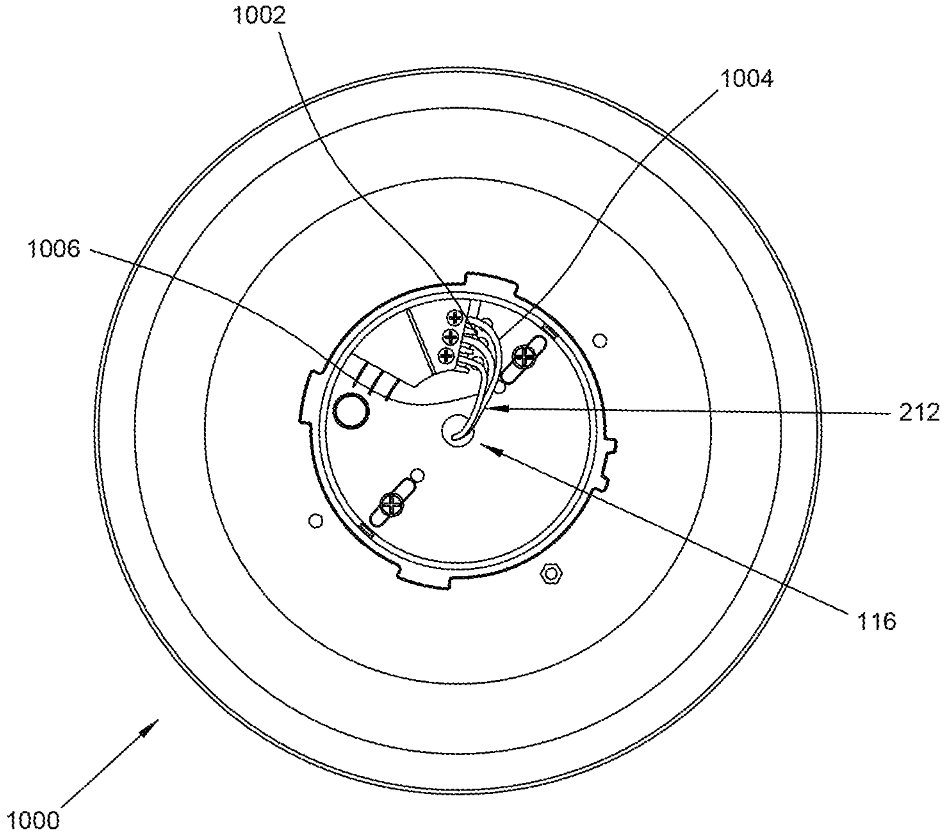
FIG. 10 is a top plan view of a light fixture coupled to a cover that physically and electrically attaches to the below-the-ceiling junction box of FIG. 1 in a single movement, in accordance with an embodiment of the present invention.

Advantageously, the present invention allows for the quickest and most convenient structure and method of replacing a ceiling fan with a light-only structure known to date (or vice versa). More specifically, if one wanted to remove a fan from their ceiling, for example, if someone installed bunk beds in their children's room and wanted to remove the hazard of spinning blades near the top bunk, The process flow chart of FIG. 9 shows the simple method. The process starts at step 900 and moves to step 902 where a fan is electrically disconnected from the plug 406. In step 904, the fan is uninstalled from the ceiling by removing it from the cradle 506. Next, in step 906, the cover 400 can be removed by simply rotating it with relation to the above-the-ceiling junction box 100. In step 908, a new cover 1000, shown in FIG. 10, is inserted within the above-the-ceiling junction box 100 and rotated to make a physical and electrical connection. The process ends at step 910. The cover 1000 is electrically similar to the cover 400 but, instead of having the ceiling fan mounting bracket 501, it has lights, e.g., LED, on its exterior (opposite to the side shown in FIG. 10) that are powered by the electrical connections of the above-the-ceiling junction box 100 once it is physically coupled to the above-the-ceiling junction box 100. The above-the-ceiling junction box 100 allows for lights, fans, and any similar structure to be installed onto ceilings within minutes and without the need for making raw electrical connections with wire nuts and stripping wires each time.

In summary, a fan motor, light and electronics (for wireless communication and other remote features) start with loose wire leads that need to be connected to a power source. The prior-art method of installing these components is difficult, dangerous, and out of favor with users and in need of replacement. The presently inventive novel device and method allow the electrical power (from fan/light to power source) to be connected safely and securely through use of the electrical mounting bracket assembly 700, 1200. An installer does not have to "hard wire" (connecting of loose wires from the fan to loose and exposed live wire leads/ends coming from power source) to provide electrical power to the fan/light. The electrical mounting bracket assembly 700, 1200 for ceiling fans now supplies and provides a much safer and secure power supply source to the fan, light, and remote controls while at the same time mounting the fan to the ceiling with a simple twist lock or other type of interlocking method/movement/structure that can engage the two parts (below-the-ceiling junction box 100 and cover 400). The industry knowledge that this presently inventive novel device and method for a safer and easier installation for ceiling fans is available will also help increase market sales for new fan purchases and for the replacement of older broken or outdated fans.

The claims appended hereto are meant to cover all modifications and changes within the scope and spirit of the present invention.

What is claimed is:

1. A single-step mechanical/electrical ceiling fan/light mounting assembly comprising:
- a below-the-ceiling junction box having:
  - a ceiling/wall contact side defining a wire aperture sized and shaped to allow a power wire to pass from an above-the-ceiling area into the below-the-ceiling junction box;
  - a first half of a mechanical couple; and
  - a first half of an electrical couple having at least two input wire terminals located within the below-the-ceiling junction box, the at least two input wire terminals being accessible to an installer and removably couplable to the power wire passing from the above-the-ceiling area; and
- a cover assembly, having:
  - a ceiling fan mounting bracket;
  - a second half of the mechanical couple that is shaped to mate with the first half of the mechanical couple;
  - a second half of the electrical couple that electrically couples with the first half of the electrical couple as the second half of the mechanical couple mates with the first half of the mechanical couple; and
  - a ceiling fan power connector electrically connected to the second half of the electrical couple;
- wherein:
  - the first half of the mechanical couple mates with the second half of the mechanical couple when the ceiling fan mounting bracket is physically coupled to and rotated relative to the below-the-ceiling junction box.

2. The single-step mechanical/electrical ceiling fan mounting assembly according to claim 1, wherein the below-the-ceiling junction box comprises:
- a wire terminal block that physically couples at least two wires originating from outside the below-the-ceiling junction box to a wire terminal block on the cover assembly.

3. The single-step mechanical/electrical ceiling fan mounting assembly according to claim 2, wherein outside the below-the-ceiling junction box is from above a ceiling that the below-the-ceiling junction box is coupled to.

4. The single-step mechanical/electrical ceiling fan mounting assembly according to claim 1, wherein the ceiling fan mounting bracket is a ball socket.

5. The single-step mechanical/electrical ceiling fan mounting assembly according to claim 1, wherein the ceiling fan mounting bracket is a flush mount bracket.

6. The single-step mechanical/electrical ceiling fan mounting assembly according to claim 1, further comprising:
- a remote-controlled controller located between the ceiling fan power connector and the first half of the electrical couple.

7. The single-step mechanical/electrical ceiling fan mounting assembly according to claim 1, further comprising:

a light fixture mounting bracket, having:

a second second half of the mechanical couple that is shaped to mate with the first half of the mechanical couple;

a second second half of the electrical couple that electrically couples with the first half of the electrical couple as the second second half of the mechanical couple mates with the first half of the mechanical couple; and a light emitting element electrically coupled to the second half of the electrical couple.

8. A single-step mechanical/electrical ceiling fan/light mounting method comprising:

mounting a below-the-ceiling junction box having a first half of a mechanical couple and a first half of an electrical couple to a ceiling;

electrically coupling the first half of the electrical couple to a power source emanating from an above-the-ceiling area, the electrical coupling taking place entirely within the below-the-ceiling junction box; and mechanically and electrically mating to the below-the-ceiling junction box a cover assembly having:

a second half of the mechanical couple that is shaped to mate with the first half of the mechanical couple;

a second half of the electrical couple that electrically couples with the first half of the electrical couple as the second half of the mechanical couple mates with the first half of the mechanical couple;

a ceiling fan mounting bracket; and a ceiling fan power connector electrically connected to the second half of the electrical couple;

wherein the mating step further includes:

physically rotating the cover assembly with relation to the below-the-ceiling junction box until the first half of the mechanical couple mates with the second half of the mechanical couple.

9. The method according to claim 8, wherein the below-the-ceiling junction box comprises:

a wire terminal block that physically couples at least two wires originating from outside the below-the-ceiling junction box to a wire terminal block on the ceiling fan mounting bracket.

10. The method according to claim 9, wherein outside the below-the-ceiling junction box is from above a ceiling that the below-the-ceiling junction box is coupled to.

11. The method according to claim 8, wherein the ceiling fan mounting bracket is a ball socket.

12. The method according to claim 8, wherein the ceiling fan mounting bracket is a flush mount bracket.

13. The method according to claim 8, further comprising:

providing a remote-controlled controller between the ceiling fan power connector and the first half of the electrical couple.

14. The method according to claim 8, further comprising:

replacing the cover assembly with a light fixture mounting bracket, having:

a second half of the mechanical couple that is shaped to mate with the first half of the mechanical couple;

a second half of the electrical couple that electrically couples with the first half of the electrical couple as the second half of the mechanical couple mates with the first half of the mechanical couple; and a light emitting element electrically coupled to the second half of the electrical couple.

15. The method according to claim 14, wherein the replacing step comprises:

establishing an electrical and mechanical connection for the light fixture mounting bracket with a single physical movement.

* * * * *